United States Patent [19]
Ahn

[11] Patent Number: 6,078,314
[45] Date of Patent: Jun. 20, 2000

[54] MOBILE INFORMATION TERMINAL AND OPERATING METHOD THEREOF

[75] Inventor: Sung-hyun Ahn, Kunpo, Rep. of Korea

[73] Assignee: Samsung Electronics Co., Ltd., Kyungki-do, Rep. of Korea

[21] Appl. No.: 09/058,169

[22] Filed: Apr. 10, 1998

[30] Foreign Application Priority Data

Apr. 11, 1997 [KR] Rep. of Korea ............ 97-13418

[51] Int. Cl.[7] ............................................. G06F 3/023
[52] U.S. Cl. ................... 345/169; 345/173; 345/339; 345/357; 707/3; 707/10; 707/102; 707/526
[58] Field of Search ............................. 707/3, 10, 102, 707/526; 345/339, 357, 169, 173

[56] References Cited

U.S. PATENT DOCUMENTS

| | | | |
|---|---|---|---|
| 5,245,559 | 9/1993 | Lapeyre | 708/174 |
| 5,278,673 | 1/1994 | Scapa et al. | 358/473 |
| 5,289,394 | 2/1994 | Lapeyre | 708/142 |
| 5,786,819 | 7/1998 | Weiser et al. | 345/354 |
| 5,790,974 | 8/1998 | Tognazzini | 455/456 |
| 5,949,408 | 9/1999 | Kang et al. | 345/169 |

FOREIGN PATENT DOCUMENTS

| | | | |
|---|---|---|---|
| 405216574 | 8/1994 | Japan . | |
| 7-503333 | 4/1995 | Japan | G06F 15/02 |
| 8-190456 | 7/1996 | Japan | G06F 3/033 |

*Primary Examiner*—Jean R. Homere
*Attorney, Agent, or Firm*—Sughrue, Mion, Zinn, Macpeak & Seas, PLLC

[57] ABSTRACT

An apparatus and a method for retrieving information in a mobile information terminal are provided. The device includes a display, a position detector and a controller. The display displays a data display area for showing information depending on retrieval commands and a button area which is always displayed in a restricted size at a predetermined position and includes a plurality of buttons for inputting at least one command for creating a connection with the host for retrieval, a command for transferring to a retrieval area, and a command for selecting of an item to be searched. The position detector detects positional data corresponding to a button pressed by a user. The controller searches information from the host according to a command corresponding to the positional data detected by the position detector, and allows the searched information to be displayed on the data display area of the display. Accordingly, use of a keyboard can be minimized by installing essential commands in the form of buttons. Also, searched data is conveniently displayed on one screen for a user.

8 Claims, 2 Drawing Sheets

MOBILE INFORMATION TERMINAL AND OPERATING METHOD THEREOF

BACKGROUND OF THE INVENTION

1. Field of the Invention

The present invention relates to a mobile information terminal, and more particularly, to a mobile information terminal having command buttons and an operating method thereof.

2. Description of the Related Art

A dummy terminal has been generally used for retrieving text-oriented information. The development of communication systems and an increase in information providing services has led to the development of terminal emulators that emulate terminals by using software. The terminal emulator currently retrieves text-oriented information, and has been widely used in various environments ranging from mobile information terminals, personal computers and main frame computers. Most emulators have adopted pointing devices such as a pen, a mouse, or the like.

A pointing device must be adopted for information retrieval particularly when a physical keyboard is not available, as in a mobile information terminal. For example, in a mobile information terminal such as a personal digital assistant (PDA), a user inputs a retrieval command using a pen. In this case, the internal configuration of the mobile information terminal is designed to facilitate input of commands via the pen. However, a keyboard is required to connect external application programs via on-line communications, and in particular, to use text-oriented information retrieval services.

The mobile information terminal adopts a software keyboard to input retrieval commands instead of a physical keyboard, because its input device is limited in size. However, a software keyboard typically occupies a part of a screen, which impedes the display of the entire amount of retrieved data on one screen. Accordingly, an operator is required to execute special operations, such as scrolling up or down, in order to view undisplayed portions of the entire amount of retrieved data.

SUMMARY OF THE INVENTION

To solve the above problem, it is an object of the present invention to provide a mobile information terminal having command buttons which are positioned on a predetermined part of a screen and an operating method thereof.

To accomplish the above object, there is provided a mobile information terminal. The terminal, which receives information search commands, transmits the commands to a host, receives the searched information from the host, and displays the information, includes a display, a position detector and a controller. The display has a data display area, for showing information depending on retrieval commands, and a button area, which is always displayed in a restricted size at a predetermined position. The display includes a plurality of buttons for inputting at least one command for creating a connection with the host for retrieval, a command for transferring to a retrieval area, and a command for selecting an item to be searched. The position detector detects positional data corresponding to a button pressed by a user. The controller transmits a command corresponding to the positional data detected by the position detector to the host, receives the searched information from the host and allows the searched information to be displayed on the data display area of the display.

To accomplish the above object, there is provided an operating method of a mobile information terminal which receives an information search command, transmits the command to a host, receives the searched information from the host and displays the information, by including a display which is always displayed in a restricted size at a predetermined position, and displays a button area, including a plurality of buttons for inputting at least one command for creating a connection with the host for retrieval, a command for transferring to a retrieval area, and a command for selecting an item to be searched. The method comprises steps (a) through (c) below: (a) determining whether positional data corresponding to the button is detected; (b) transmitting a command corresponding to the positional data to the host, when it is determined in step (a) that the positional data is detected; and (c) receiving the searched information from the host and displaying the information.

BRIEF DESCRIPTION OF THE DRAWING

The above object and advantage of the present invention will become more apparent by describing in detail a preferred embodiment with reference to the attached drawings in which.

DESCRIPTION OF THE PREFERRED EMBODIMENT

Figure 1:
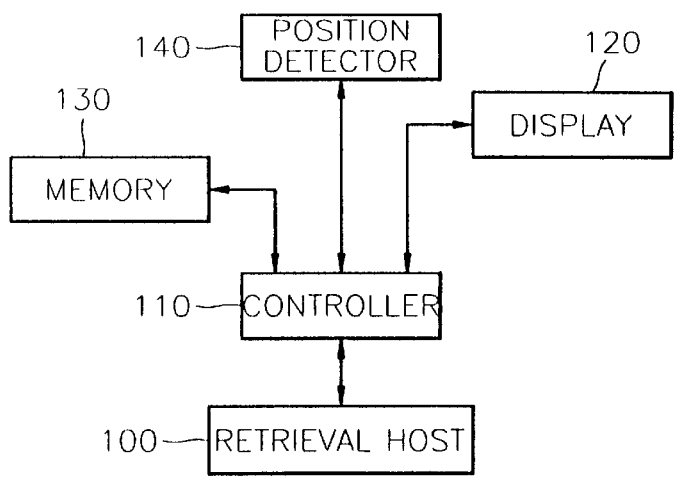
FIG. 1 is a block diagram of a mobile information terminal, according to an embodiment of the present invention.

Referring to FIG. 1, a mobile information terminal according to an embodiment of the present invention includes a retrieval host 100, a controller 110, a display 120, a memory 130 and a position detector 140.

The display 120, a device for displaying data that is necessary for retrieving information, is preferably an LCD or a CRT. The display 120 is divided into a data display area 210 and a button area 220. The data display area 210 displays information depending on a search command. The button area 220 always occupies a restricted portion of the display 120, and displays a plurality of buttons for allowing at least the input of a command for creating a connection with the retrieval host 100, a command for transferring to a desired search area, and a command for selecting a search item. These buttons are a type of software keys.

Figure 2:
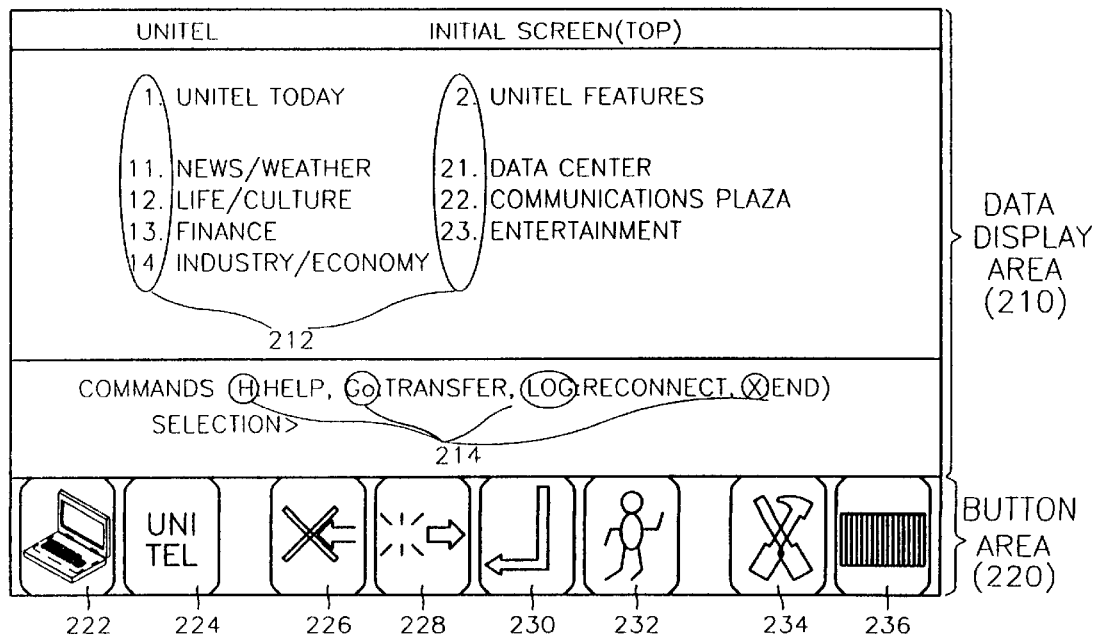
FIG. 2 shows an example of a screen displayed on the display of FIG. 1.

FIG. 2 shows an example of a screen to be displayed on the display 120, which is an initial screen of a local communications service (UNITEL) on which a command selected by a user is received. In FIG. 2, reference numeral 222 is a button for connecting with the retrieval host 100, reference numeral 224 is a button for creating a connection to UNITEL, reference numerals 226, 228 and 230 are buttons for backspace, space and return functions, respectively, reference numeral 232 is a button for transferring to a search area, reference numeral 234 is a button for installing a communications environment necessary for retrieving and connecting, and reference numeral 236 is a keyboard button.

The memory 130 stores commands corresponding to information and buttons displayed on the display 120. The position detector 140 detects positional data with respect to the button pressed by a user. The controller 110 reads from the memory 130 a command corresponding to positional data detected by the position detector 140, retrieves information from the retrieval host 100, and then allows the retrieved information to be displayed on the data display area 210 of the display 120.

Figure 3:
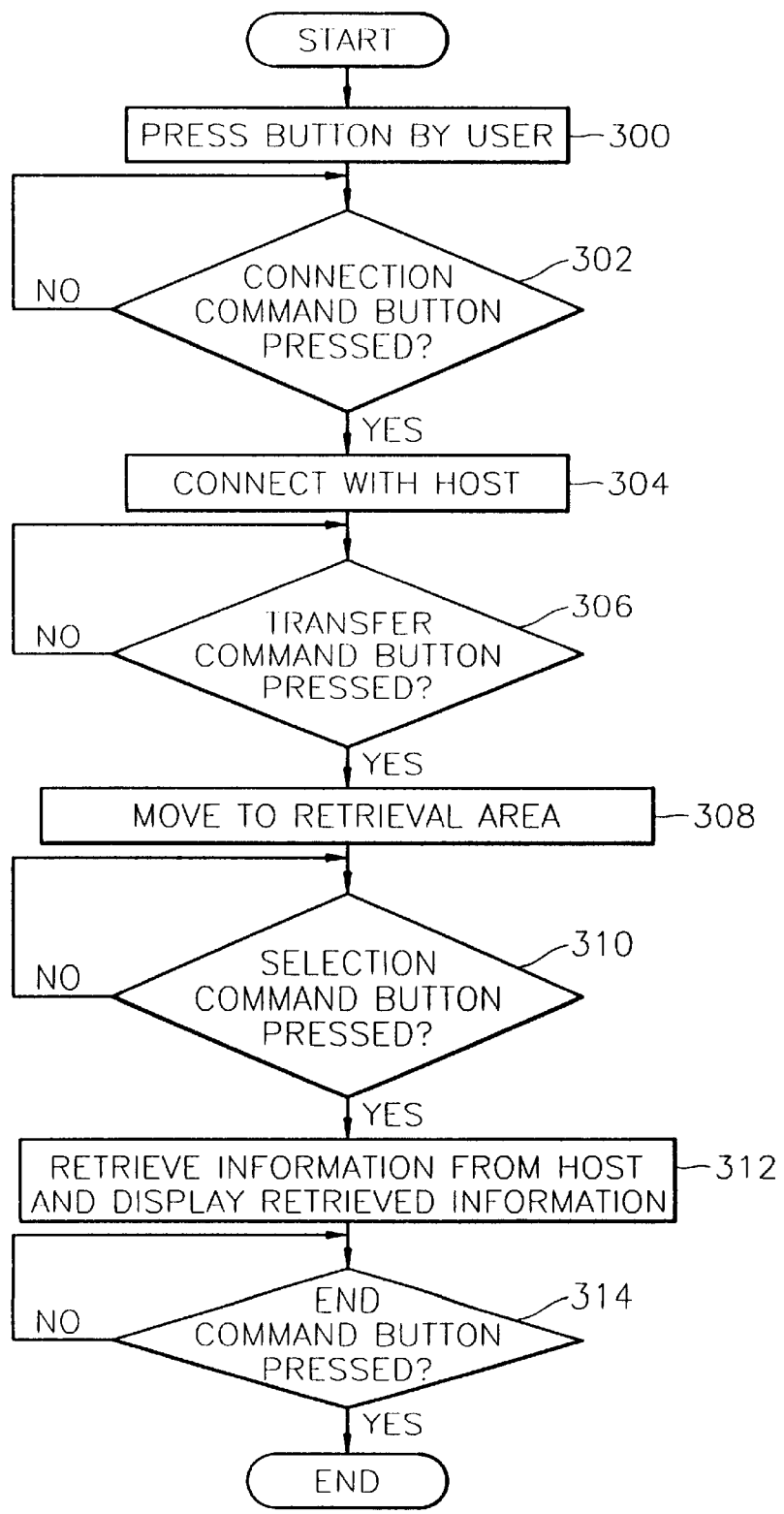
FIG. 3 is a flowchart illustrating an operating method of a mobile information terminal, according to the present invention.

The operation of the device shown in FIG. 1 will now be described with reference to FIGS. 2 and 3.

The following describes a method a user would perform to search for information about 'GO MBC 2580' via UNI-TEL. First, the connection command button 224 is pressed to create a connection with the retrieval host 100, in step 300. When it is determined in step 302 that the connection command button 224 has been pressed, the position detector 140 detects positional data corresponding to the pressed button and informs the controller 110 of the result. The controller 110 reads a command from the memory 130, corresponding to the positional data detected by the position detector 140, and initiates a connection with the retrieval host 100, in step 304. When the transfer command button 232 is pressed in step 306, 'GO' is displayed on the data display area 210 of the display 120. After pressing the space function button 228, a keyboard is displayed by pressing the keyboard button 236. The keyboard sets a mode for displaying only English characters and numeric characters, in order to minimize the space occupied by the displayed keyboard in the data display area 210. However, required, the keyboard can set a mode for displaying either only English characters or only Korean characters. English characters 'MBC' are input, the space function button 228 is pressed, and then numeric characters '2580' are input.

After 'GO MBC 2580' is displayed on the display 120, the keyboard disappears from the display 120. Then, return function button 230 is pressed. Thereafter, the position detector 150 detects positional data corresponding to the pressed button. The controller 110 reads a command from the memory 140, corresponding to the detected positional data, so that the search area is transferred to the 'GO MBC 2580' area, in step 308. Then, it is determined whether a selection command button is pressed, in step 310. When it is determined that the selection command button has been pressed, the controller 110 searches information from the retrieval host 100 and displays the searched information on the data display area 210 of the display 120, in step 312. Here, the selection command is a command for displaying information on a concrete area to be searched, for example, from the MBC 2580 area. If frequently searched areas are stored in the memory 130 using the retrieval environment setting button 234, pressing only one command button 232 would allow movement into the frequently searched areas. If it is determined that the retrieval end command button is pressed, the information retrieval is finished, in step 314.

In addition, the device according to the present invention can input an information search command using a pointing device. Assume that an initial screen, such as FIG. 2, is displayed on the display 120. Reference numeral 212 denotes numbers of the types of data which a user can select to receive desired information. These numbers are used in connection with commands, such that when a button is pressed, retrieval is performed. Reference numeral 214 denotes commands provided from the retrieval host 100 to the user, i.e., a series of commands such as a command for retrieval of stored data or a command for movement to an upper or lower level menu.

Assume that a user inputs one of the numbers shown in FIG. 2. If the user wants to search the 'news/weather' section, first, the user points the pointing device over the number '11' on the data display area 210. When a search command is input using a pen, the position detector 140 detects the position pressed by the pen as positional data of columns and rows. The controller 110 reads a command corresponding to the detected positional data from the memory 130, searches information from the retrieval host 100, and allows the searched information to be displayed on the data display area 210 of the display 120.

The present invention is not limited to the above-described embodiment, and it is apparent that modifications may be effected by those skilled in the art within the spirit of the present invention. In the above embodiment of the present invention, information retrieval can be performed using a button or using a pointing device. Also, information retrieval can be performed by using both the button and the pointing device. Furthermore, the button area can additionally include various function buttons, such as buttons for menu up/down function, an end button, or a button for moving to an upper or lower level menu.

According to the present invention, use of a keyboard can be minimized by implementing essential commands in the form of buttons, and a user can conveniently display searched data on one screen. Also, the number of user actions can be remarkably reduced by inputting search commands using the pointing device instead of the keyboard.

What is claimed is:

1. A mobile information terminal which receives information search commands, transmits the commands to a host, receives the searched information from the host and displays the information, said device comprising:

a display which displays a data display area for showing information, depending on retrieval commands, and a button area, which is always displayed in a restricted size at a predetermined position and includes a plurality of buttons for inputting at least one command for creating a connection with said host for retrieval, a command for transferring to a retrieval area, and a command for selecting an item to be searched;

a position detector which detects positional data corresponding to a button pressed by a user; and a controller which transmits a command corresponding to the positional data detected by said position detector to the host, receives the searched information from the host and allows the searched information to be displayed on said data display area of said display.

2. A mobile information terminal as claimed in claim 1, wherein said button area includes a space function button, a backspace function button, a button for installing a communications environment necessary for retrieving and connecting, a keyboard button and a search end button.

3. A mobile information terminal as claimed in claim 1, further comprising:

a pointer which overlaps the data display area of said display and selectively points to numbers of information on the data display area and predetermined commands associated with the retrieval of the information using said pointer; and a pointing position detector for detecting positional data corresponding to the number and command designated by said pointer.

4. An operating method of a mobile information terminal which receives an information search command, transmits the command to a host, receives the searched information from the host and displays the information, that includes a display which is always displayed in a restricted size at a predetermined position and displays a button area including a plurality of buttons for inputting at least one command for creating a connection with said host for retrieval, a command for transferring to a retrieval area, and a command for selecting an item to be searched, said method comprising:

(a) determining whether positional data corresponding to said button is detected;

(b) transmitting a command corresponding to the positional data to the host, when it is determined in step (a) that the positional data is detected; and (c) receiving the searched information from the host and displaying the information.

5. An operating method of a mobile information terminal as claimed in claim 4, further comprising:

(d) determining whether positional data corresponding to a space function button is detected; and (e) performing a space function on the basis of a command corresponding to said space function positional data, when it is determined in step (d) that said space function positional data is detected.

6. An operating method of a mobile information terminal as claimed in claim 4, further comprising the steps of:

(d) determining whether positional data corresponding to a backspace function button is detected; and (e) performing a backspace function on the basis of a command corresponding to said backspace function positional data, when it is determined in step (d) that said backspace function positional data is detected.

7. An operating method of a mobile information terminal as claimed in claim 4, further comprising:

(d) determining whether positional data corresponding to a keyboard button is detected; and (e) displaying a keyboard at a predetermined position of said display in a restricted size, on the basis of a command corresponding to said keyboard positional data, when it is determined in step (d) that said keyboard positional data is detected.

8. An information retrieval method in a mobile information terminal as claimed in claim 4, further comprising:

(d) determining whether positional data corresponding to a retrieval end button is detected; and (e) finishing the retrieval from said host on the basis of a command corresponding to said retrieval end positional data, when it is determined in step (d) that said retrieval end positional data is detected.

* * * * *